United States Patent [19]
Levy

[11] Patent Number: 5,541,762
[45] Date of Patent: Jul. 30, 1996

[54] ANTIGLARE OPTICAL DEVICE

[76] Inventor: George S. Levy, 3980 Del Mar Meadows, San Diego, Calif. 92130

[21] Appl. No.: 355,075

[22] Filed: Dec. 13, 1994

Related U.S. Application Data

[63] Continuation-in-part of Ser. No. 317,137, Sep. 26, 1994, which is a continuation-in-part of Ser. No. 11,743, Feb. 1, 1993, Pat. No. 5,351,151.

[51] Int. Cl.$^6$ .......................... G02B 27/10; G02B 23/00
[52] U.S. Cl. ..................... 359/240; 359/265; 359/237; 359/298; 359/238; 359/239; 359/242
[58] Field of Search .................................. 359/240, 265, 359/237, 298, 238, 239, 242; 350/174

[56] References Cited

U.S. PATENT DOCUMENTS 4,447,128  5/1984  Ferrer ........................ 350/174
5,351,151  9/1994  Levy ........................ 359/240

*Primary Examiner*—Viet Q. Nguyen
*Attorney, Agent, or Firm*—John R. Ross

[57] ABSTRACT

A device for viewing an object field containing intense light sources which could be disturbing or harmful to the human eye. Light from the object field is focused at a focal plane located within a layer of photochromic material. An intense light source produces an opaque mask in the photochromic layer. This mask matches the location and shape of the image of the intense light source at the image plane. An eyepiece permits a viewer to view the image plane to obtain an image of the object field with light from the intense light source dimmed by the opaque mask in the photochromic layer.

23 Claims, 11 Drawing Sheets

ANTIGLARE OPTICAL DEVICE

This application is a continuation-in-part of patent application Ser. No. 08/317,137 filed Sep. 26, 1994 which was a continuation in part of Ser. No. 08/011,743 filed Feb, 1, 1993, now U.S. Pat. No. 5,351,151. This invention relates to optical instruments and more particularly, to optical instruments such as binoculars, rearview mirrors, welding visors, spacesuit goggles and periscopes for viewing with the human eye.

BACKGROUND OF THE INVENTION

Directing an optical instrument such as binoculars toward an intense light source such as the sun can be very hazardous to the eyes. In astronomical instruments, this problem is sometimes solved by placing in the focal plane inside the instrument, an opaque disk positioned exactly at the focused image of the sun. The disk has the same dimension as the image of the sun and thus blocks out the solar rays. In energy detection devices such as the ones described in U.S. Pat. No. 3,020,406 by T. R. Whitney and U.S. Pat. No. 3,714,430 by R. C. Finvoid, a photochromic layer is placed at the focal plane of the device in order to protect sensitive photodetectors. The high energy rays cause the photochromic material to increase in opacity at those points where the rays are most intense. Thus, high intensity rays are attenuated by the same dark spots they generate, and dim rays are left unaffected. Many photochromic chemicals and systems are available. A technique for generating photochromic chemical is described in U.S. Pat. No. 5,062,693.

These prior art devices make use of photochromic material sensitive to infrared radiation, such as germanium and gallium arsenide. Furthermore, these devices are specifically designed to protect inanimate energy detectors and transducers.

There is a need to reduce glare in conventional instruments such as rearview mirrors, binoculars, welding visors and periscopes, operating with classical optics and visible light, and specifically, to protect human vision from high intensity light sources such as the sun, car headlights and welding arcs. In addition, the size of the instruments should be minimized by folding the optical path. As is well known in optics, this can be achieved by the use of prisms and mirrors.

SUMMARY OF THE INVENTION

The present invention provides a device for viewing an object field containing intense light sources which could be disturbing or harmful to the human eye. Light from the object field is focused at a focal plane located within a layer of photochromic material. An intense light source in the object field produces an opaque mask in the photochromic layer. This mask matches the location and shape of the image of the intense light source at the image plane. An eyepiece permits a viewer to view the image plane, and obtain an image of the object field in which rays from the intense light source are dimmed by the opaque mask in the photochromic layer. This invention is applicable to the design of instruments for human viewing, such as rearview mirrors, welding visors, binoculars, space goggles, and periscopes.

DETAILED DESCRIPTION OF PREFERRED EMBODIMENTS

The present invention can be described by reference to the drawings. It comprises two subsystems, the optical system and the photochromic system.

Description of the Optics

Figure 1:
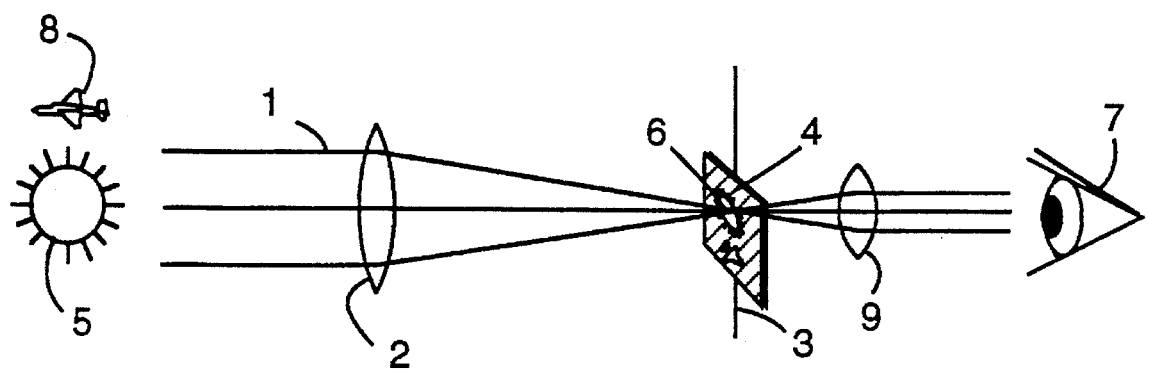
FIG. 1 is a drawing showing the principal elements of an inverting telescope equipped with an antiglare layer in the focal plane between the two lenses.

We shall first describe the general principle of an antiglare device. FIG. 1 describes a simple inverting telescope modified to eliminate glare. Light rays 1 enter the objective lens 2 and are focused on the focal plane 3 which lies within the photochromic layer 4. Rays originating from an intense source such as the sun 5 create a dark spot 6 on the photochromic layer. This spot, in turn, substantially blocks out the light of the sun, permitting a viewer 7 to see an image of an airplane 8 flying at an angular position near the sun. The rays leave the telescope through the eyepiece lens 9.

This technology is clearly applicable to non-inverting telescopes that generate internally a real image such as the Newtonian and Cassegrain models.

Figure 1B:
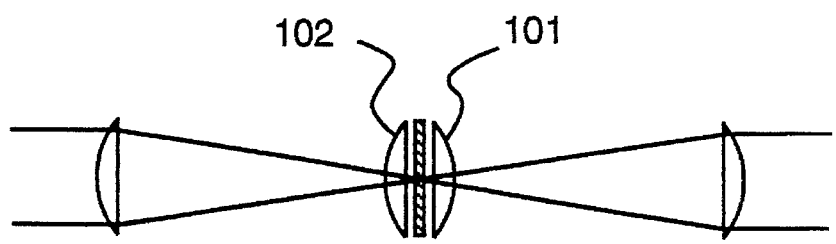
FIG. 1B Illustrates how field lenses can be placed to increase the field of view.

As indicated in FIG. 1B, the device field of view can be increased by using the well known technique of imaging the objective lens unto the eyepiece by means of field lenses 101 and 102.

The lenses do not have to be simple lenses as outlined above, but could be compound lenses or curved mirrors as needed, to improve the quality of the image, reduce aberrations and decrease the weight of the device.

Figure 1C:
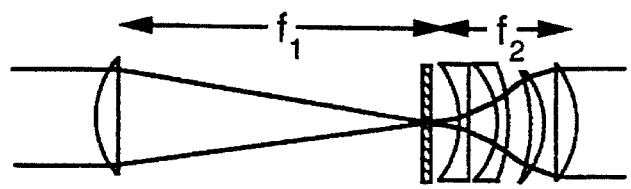
FIG. 1C describes how a compound lens design can reduce the length of the optical path without changing the device magnification.

Compound lenses can also reduce the effective focal length, $f_2$, as shown in FIG. 1C. This figure shows a telescope system with a magnification of unity in which one of the focal distances has been reduced by means of a compound lens arrangement.

The optical path could be folded to reduce the size of the device, by means of prisms or flat mirrors. While prisms can further reduce the length of the optical path because of the high index of refraction of their constituent material and thus allow the construction of more compact devices, flat mirrors have the advantage of providing low weight design solutions. In the description of specific embodiments, we shall explain how means such as mirrors and prisms can be used to reduce the dimensions of the device. Prisms and/or flat mirrors have the added function of erecting the image inverted by the convex lenses or concave mirrors in the device.

As we shall describe in the specific embodiment below, these same principles can be used in applications such as rearview mirrors, binoculars and welding helmets. This technology can also be applied to the design of space suit goggles to reduce the high contrast found in space between objects exposed to the sun and those in the shade. Astronauts exposed to high intensity sunlight lose their night adapted vision and can't see objects in the shade. This antiglare technology could benefit them.

Description of the Photochromic System

The photochromic system can comprise a single homogeneous layer or several layers which together possess a photochromic property. Multiple layer systems may offer better performance in terms of speed and sensitivity, than single layer systems.

Photochromics Using Optically Active and Photoconductive Materials

Figure 2A:
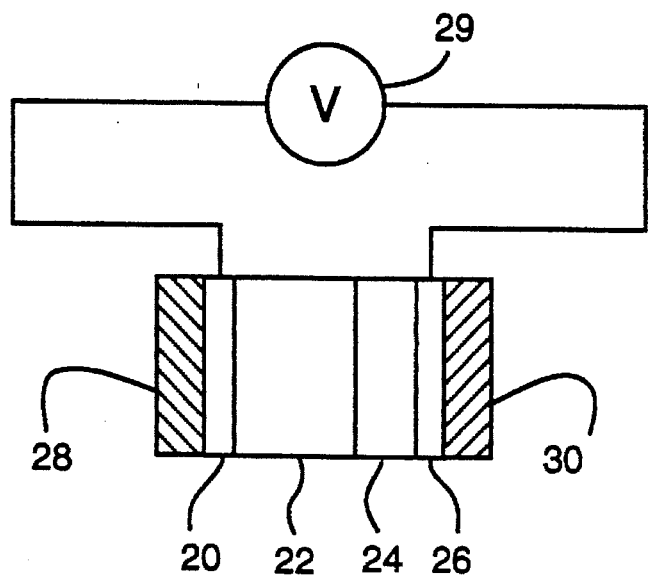
FIG. 2A illustrates the construction of a photochromic layered system using a liquid crystal.
Figure 2B:
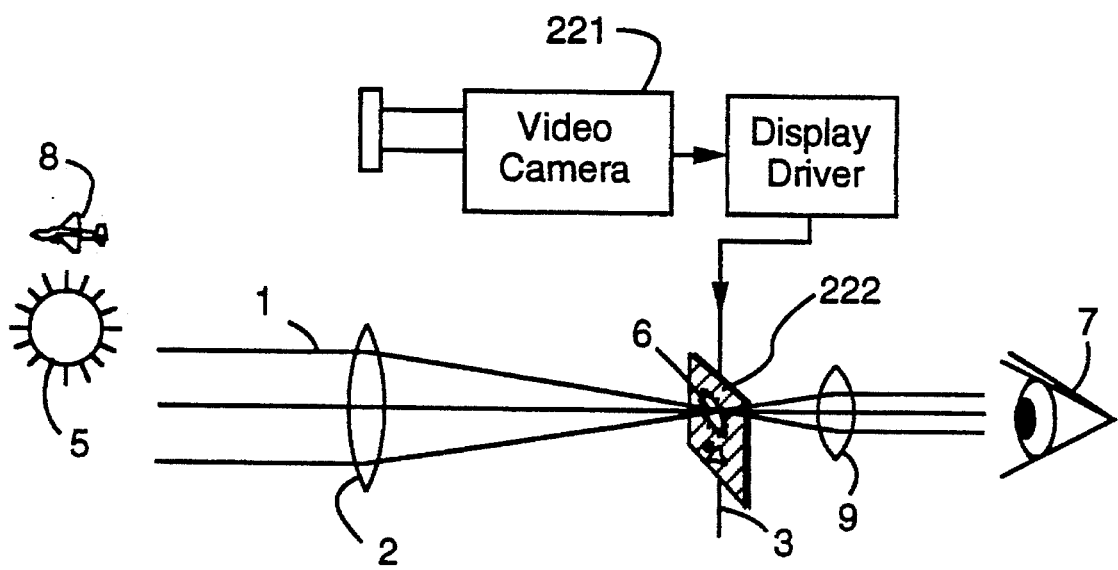
FIG. 2B describes how a video camera combined with a matrix display can operate to provide a photochromic effect.

A possible photochromic system shown in FIG. 2 uses optically active materials in conjunction with polarizers. This arrangement bears a certain resemblance to the Hughes Liquid Crystal Light Valve discussed in *Fundamentals of Photonics* by Saleh and Teich, Wiley Interscience, page 728, except that no mirror and optical isolator is used. My system comprises the following layers arranged in a stack:

1) A transparent electrode 20 made of material such as Indium Tin Oxide (ITO),
2) A photoconductive layer 22 made of Selenium.
3) An optically active layer 24 made of liquid crystal
4) A second transparent electrode 26.

A controllable electric power source 29 is applied across the electrodes and an electric field develops across the photoconductive and liquid crystal layers. When exposed to light, the photoconductive material becomes conductive in proportion to the intensity of the incident light. As a result, a spatial pattern of conductance is formed in the photoconducting layer, and the electric field across the layer is altered in those areas where the conductance is high. In turn, the liquid crystal rotates the plane of polarization of light as an inverse function of the electric field intensity. If a "twisted" nematic liquid crystal layer with a twist of 90 degrees is enclosed between two crossed polarizers 28 and 30, bright rays which are not rotated in polarization by the liquid crystal, can be attenuated by the second polarizer on their path. The polarizers must be located on each side of the aforementioned layers, along the optical axis. They may be in contact with the layer assembly as shown in the figure or, more generally, elsewhere on the optical axis of the instrument. The applied voltage must follow the drive requirements for liquid crystals to avoid electrolysis of the solution.

A variation of this approach involves the use of surface mode liquid crystals developed by Optical Shields Inc. of Menlo Park, Calif., and used without optical lenses in welding helmets sold by Jackson Products Co. of Belmont, Mich. Unlike this invention, these helmets use this liquid crystal technology without any optical lenses and therefore, darken uniformly in response to intense light. However, surface mode liquid crystals can provide selective attenuation of bright rays when placed in a system focal plane. In surface mode, liquid crystals respond to a voltage by scattering light. Thus no polarizers are needed. Since polarizers absorb at least 50% of the light even when they are not in their opaque state, surface mode liquid crystals provide a greater light transmission than regular liquid crystals using polarizers.

An advantage of using a liquid crystal technique is that applied voltage can be used to turn on or off, or otherwise gradually control the photochromic functionality of the device, as shown in FIG. 10.

Photochromic Systems Using Combinations Of Absorbing Dyes

Many organic chemicals such as 3, 4, 9, 10, perylenetetracarboxylic dianhydride (PTCDA) exhibit large nonlinear optical effects. These materials are very fast (in the nano or femtosecond range). Using techniques of molecular engineering, various molecular assemblies and mixtures may be created, with properties of light sensitivity and control, tailored to the specific application. [A. Ersen, "Laser recrystallized Si/PLZT smart spatial light modulators for optoelectronics computing," Dissertation, UCSD 1992, page 19]

Photochromics Using Photoinduced Electron Transfer Chemicals

The technique described in U.S. Pat. No. 5,062,693 by Beratan and Perry, can be used for generating phototropic chemicals, based on an electron transfer mechanism between donor molecules and acceptor molecules. These chemical pairs can be designed with customized optical properties such as photochromism and optical activity and can be used as dopants in a matrix comprising the photochromic layer. When excited by light, the molecular system changes state temporarily and reversibly. The optical properties of the excited state differ from those of the ground state. The molecular system then decays back to its ground state thus restoring the system back to its original optical properties. The number of chemical pairs capable of this behavior is significant. Well studied donor molecules include ruthenium trisbipyridyl and phthallocyanine. Acceptor molecules include methyl viologen. These chemicals would typically be embedded in some transparent matrix material. Methods of forming these chemicals in thin sheets or films is discussed in the Beratan patent.

Photochromic Effect Implemented with Video Camera and Matrix Display Layer

In such a system the photochromic function is performed by a video camera used in combination with a liquid crystal transparent display as shown in FIG. 2A. The matrix display layer 222 is a conventional black and white liquid crystal display operating as a controllable transparency, consisting of a matrix of electrodes arranged in rows and columns and used, to control liquid crystal pixels. A twisted nematic liquid crystal could be used, with a 90 degree twist and enclosed between two plates. On the first plate, electrodes are arranged in rows. On the second plate, electrodes are arranged in columns. This whole assembly is enclosed between two polarizers with parallel polarizarion axes. The resulting assembly is identical to conventional liquid crystal transparency displays.

This display is driven by a signal originating from a video camera 221, such that a negative black and white image is generated: points of high intensity light in the image generate opaque pixels. A negative image could be obtained, either by electronic means such as reversing the polarity of the video signal, or by optical means, using crossed polarizers instead of parallel polarizers.

The matrix display is inserted in the focal plane of an optical system, and the negative video image on the liquid crystal is aligned with the real image produced by the optical system. In this arrangement, the negative video image behaves like a mask that selectively blocks off high intensity rays passing through the optical system. This arrangement has clear advantages over a simple video display used to eliminate glare:

1) The resulting image is three dimensional.
2) The resolution of the antiglare mask depends on the pixel size of the video system. However, the resolution of the image depends on the optical system. Clearly, image resolution is more important than mask resolution.

Use of Materials with Properties Other than Photochromic

While a photochromic system layer at the focal plane can be used in many optical instruments, material with other properties can also be used. We shall refer to this widening in functionality by using the term "photoactive layer" to name the material at the focal plane. Thus, by photoactive we mean photochromic as well as other functions such as fluorescent and phosphorescent.

Fluorescent And Phosphorescent Materials

The photoactive layer can also be built of material such as zinc sulphide that emits visible light when illuminated by an invisible radiation [*Fundamental of Photonics* by Saleh and Teich, Wiley-Interscience, 1991, Page 456]. Zinc sulphide fluoresces with visible light when irradiated with ultraviolet light. This technique allows the construction of goggles capable of seeing invisible radiation such as ultraviolet light while providing the viewer with a stereoscopic perspective.

Description of Specific Embodiments

Among the several embodiments of the concept described in this invention, I shall describe rearview mirrors, binoculars and welding goggles.

Rearview mirrors

I shall describe a few of the many design alternatives available for constructing rearview mirrors in accordance with this invention. Such devices can be made to be mounted above the windshield, in front of the driver, or on the ceiling in the center of the car, or outside to provide a side view. They could rely on several optics technologies such as refractive optics, reflective optics and Fresnel optics.

FIG. 3 illustrates a rearview device that could be placed in front of the driver. It consists of two rectangular convex lenses 31 and 32, a 90 degree reflection prism 33 and a 90 degree reflection flat edge, roof prism 34 for image inversion. It also includes a photochromic layer system 35 in the focal plane located between the prisms. Light rays 36 enter the device through the lens 31, and are reflected by prism 33. They come in focus at the photochromic layer 35. They then are reflected and inverted by the prism 34. After traversing the lens 32 they exit the device and provide an upright image to a viewer 37. Lenses 31 and 32 can be simple as shown in the figure, or can be compound to reduce aberrations. Since the two prisms 33 and 34 are different the optical path is asymmetrical. If the photochromic layer is placed in the exact center of the device, the power of the input lens 31 and output lens 32 must be adjusted to insure that the focal plane coincides with the photochromic material. If the input and output lenses are selected to be identical, then the focal plane does not fall exactly in the center of the device and the position of the photochromic layer must be adjusted to coincide with the focal plane.

Figure 3A:
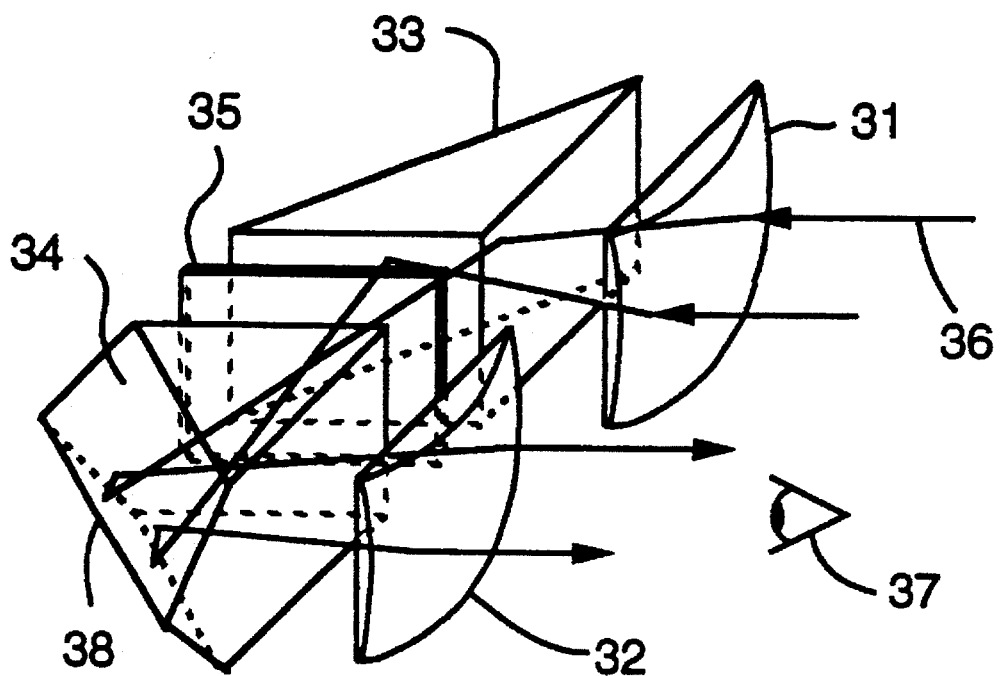
FIG. 3A shows how an antiglare rearview device for cars can be constructed using prisms.

FIG. 3A describes an almost identical device as FIG. 3 except that the lenses 131 and 132 are staggered in height. Lens 131 is lower and lens 132 is raised to provide a better view of the front road to the driver. This approach has the additional advantage that the line 38 in FIG. 3 which corresponds to the tip of the roof peak in prism 34 is not visible to the viewer.

Figure 3B:
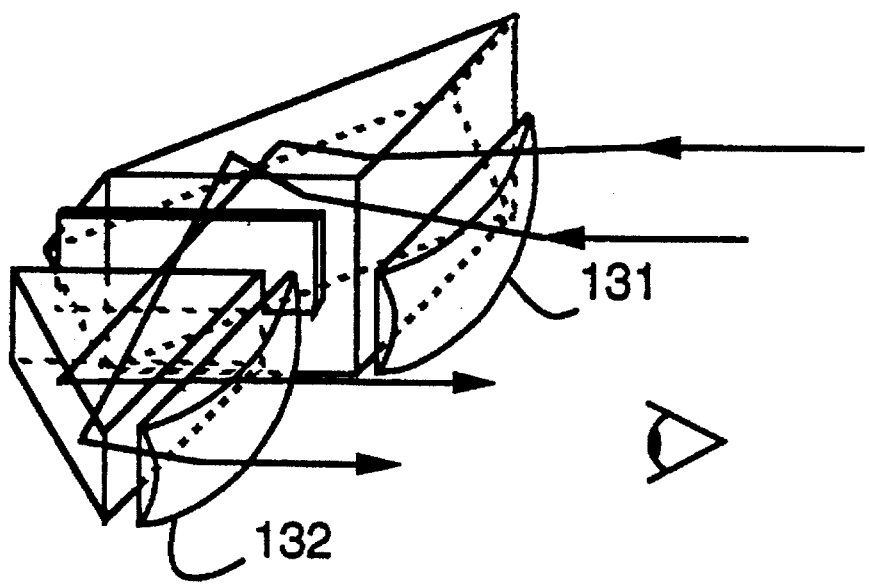
FIG. 3B provides a variation of the design illustrated in FIG. 3A, where the prisms are staggered to improve the driver's field of view.

The device described in FIG. 3B is identical to the one in FIG. 3A except that mirrors have been used to replace prisms.

Figure 3C:
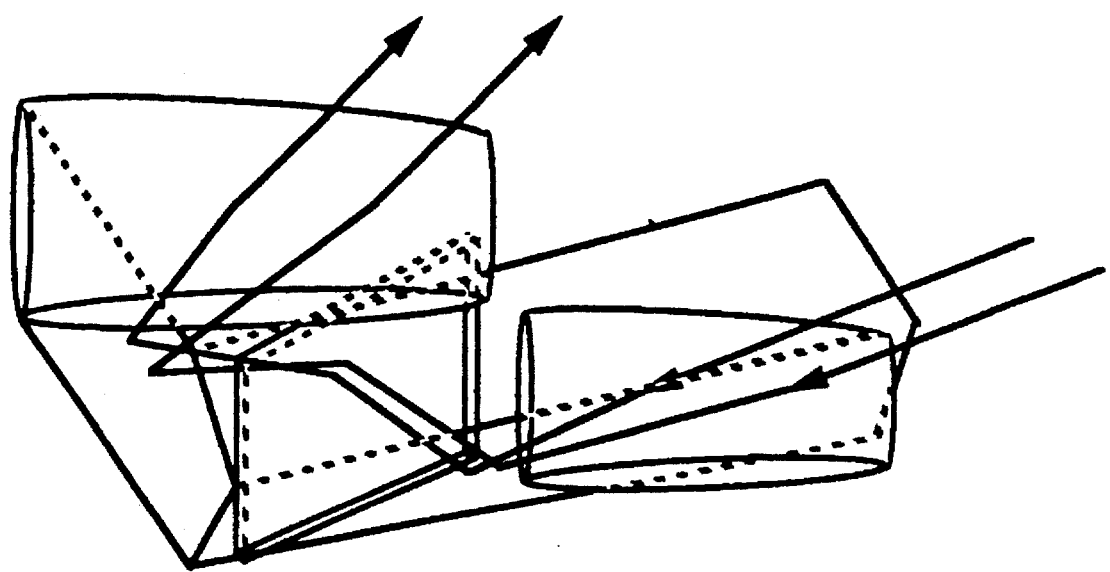
FIG. 3C illustrates how mirrors can replace prisms in the design describe in FIG. 3A.

FIG. 3C describes; a modification to the basic design in FIG. 3, which allows the driver to position the rearview device on the side of the vehicle. The figure shows a top view of the device. The angle between the surface 333 and the roof 338 has been increased such that the driver can observe the rearview image at an angle of 45 degrees from the forward direction.

Figure 3D:
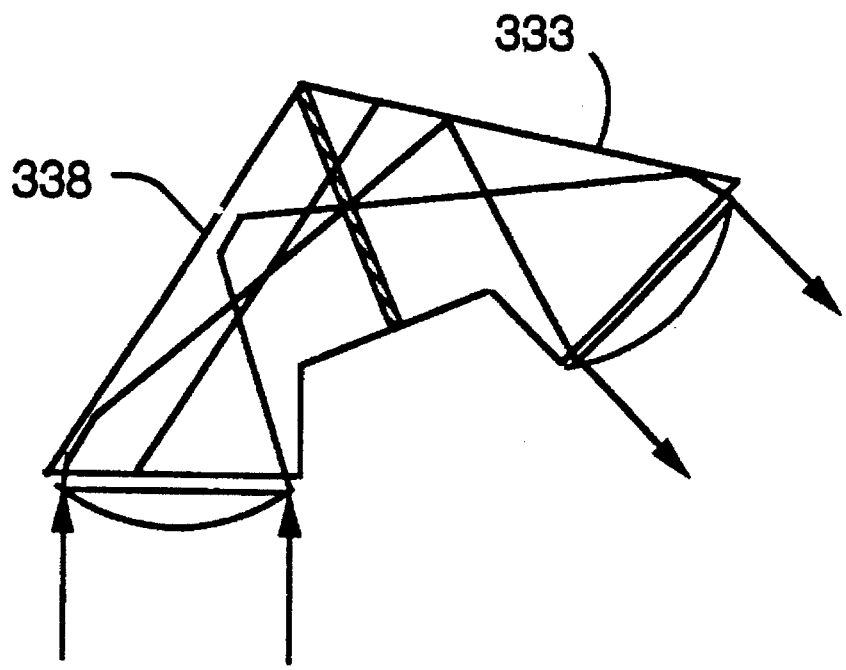
FIG. 3D shows how a side view mirror can be designed by altering the angles in the constituent prisms.
Figure 3E:
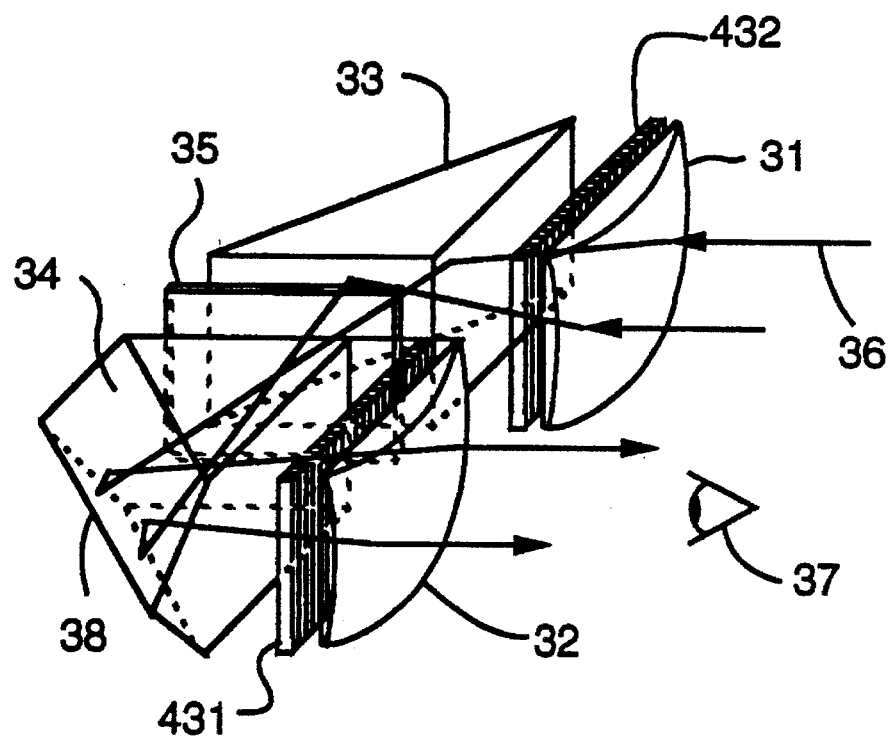
FIG. 3E shows how the basic design of FIG. 3A can be improved by adding a vane screen to stop rays with high angular deviation from the optical axis.
Figure 3F:
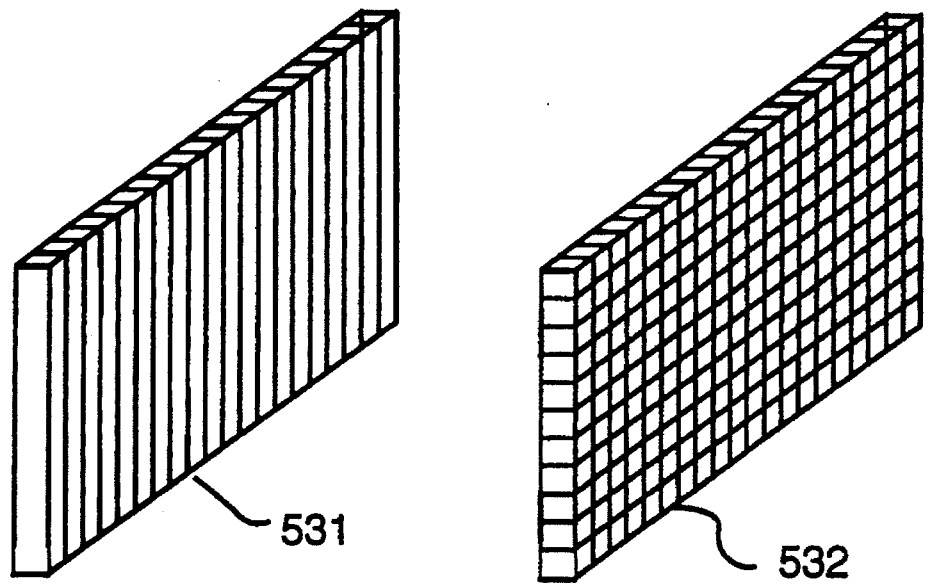
FIG. 3F shows detail of a vane screen stopping rays with high horizontal deviation, and a vane screen stopping rays with high horizontal and vertical deviation.

Rays with a high angular deviation from the optical axis can interact with the photochromic layer without being properly processed by the prisms. These rays could add unwanted components to the antiglare mask, corresponding to secondary images. It may be desirable to stop these rays. FIG. 3D is a modification on the basic design of FIG. 3, in which vanes have been inserted behind each lens to stop rays those rays with a high angular deviation. Two kinds of vanes are illustrated in FIG. 3E. Vanes 531 filter out rays only with high horizontal deviation. Vanes 532 filter out rays with both high horizontal and vertical deviations. These vanes could be placed either in front or behind the lenses. They comprise thin layers of opaque and non reflective material arranged in parallel strips, with the plane of each layer parallel to the optical axis. These strips could be arranged vertically or horizontally or both. More conventional baffles and stops are also possible as is well known in the art of optics. Design details on baffles, vanes and stops can be found in the *Handbook of Optics*, Michael Bass Ed., McGraw Hill, 1995. We use here the term baffles to refer to baffles, vanes and stops.

Figure 4A:
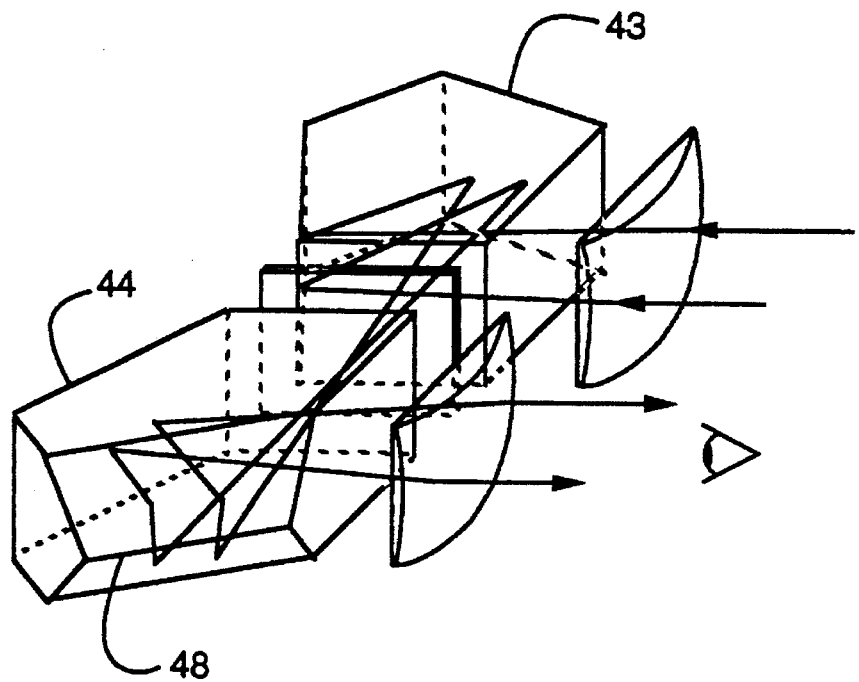
FIG. 4A describes an overhead rearview device that uses a penta prism and a modified penta prism.
Figure 4B:
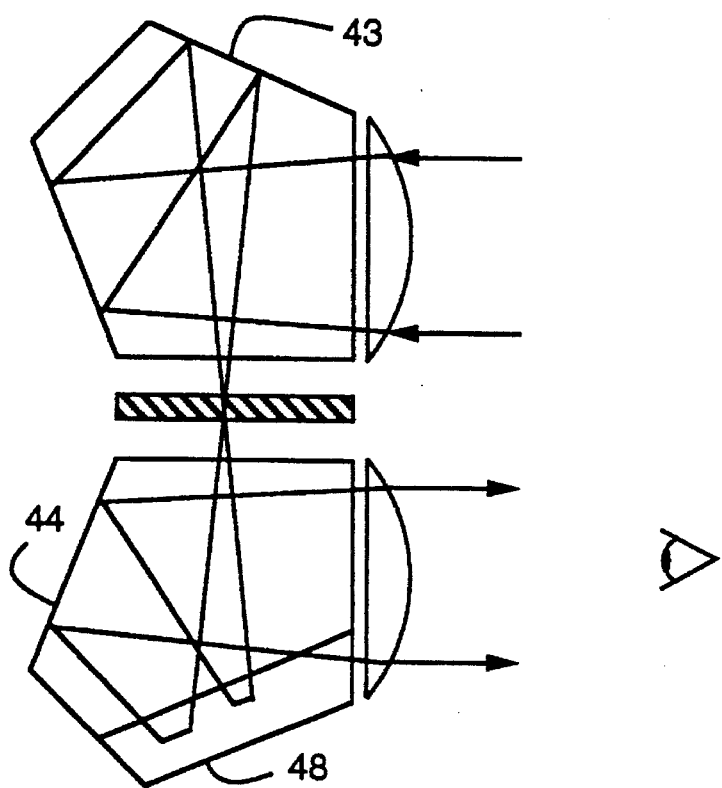
FIG. 4B is the top view of the device shown in FIG. 4A.

The device shown in FIG. 4 is identical to the one in FIG. 3 except that the prisms have been modified to achieve a longer optical path and thus avoid using lenses with low f numbers. Prism 43 is a penta prism and prism 44 is a modified penta prism which includes a roof configuration 48 to invert the image. This prism combination provides a longer optical path for light rays, at the cost of two additional reflections. The longer path is advantageous since it allows the construction of a more compact device. FIG. 4A is a top view of the device showing the penta prism 43 on top, the modified penta prism 44 on the bottom, with its roof edge 48.

Figure 5A:
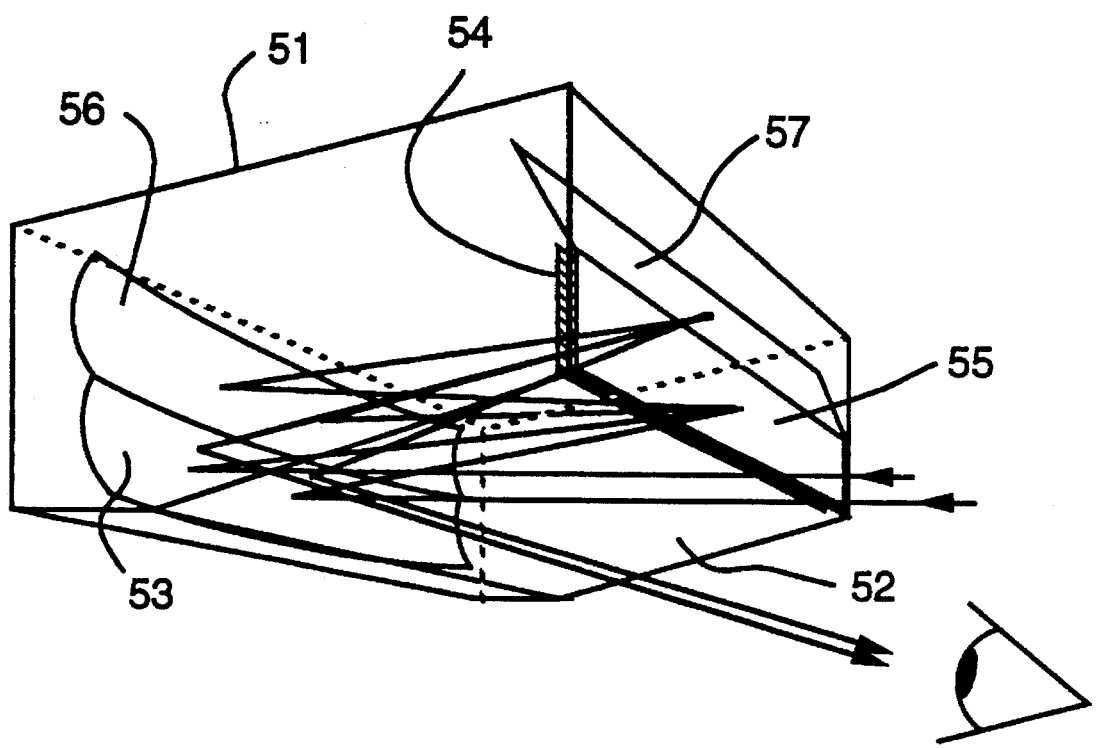
FIG. 5A illustrates the use of mirrors in the design of rearview devices.
Figure 5B:
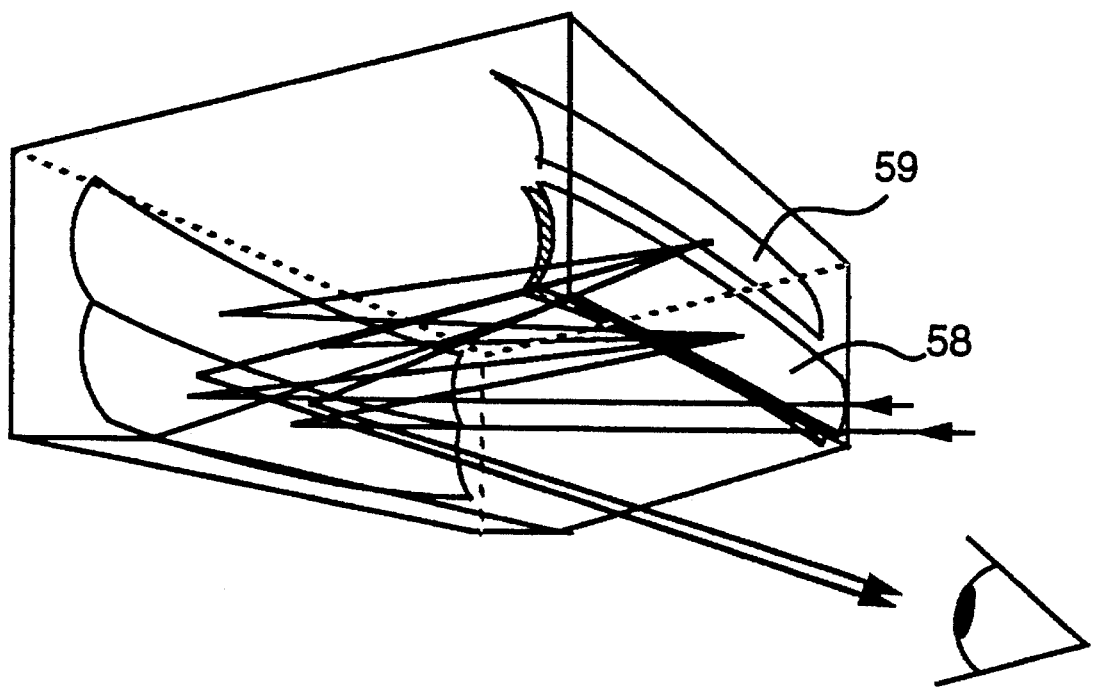
FIG. 5B shows how curved "field" mirrors can be used to widen the field of view.

FIG. 5 describes a rearview mirror using reflective optics. The device is enclosed in a box 51 equipped with a transparent panel 52 at the bottom. Light rays entering the device through this window, are reflected by a concave reflector 53. The rays are then focused on a photochromic layer 54 and immediately reflected by a flat mirror 55 located behind the photochromic layer. After passing through the photochromic layer a second time the rays are reflected by a second concave mirror 56 that has approximately double the curvature of mirror 53. The rays are then focused on, and reflected by, a flat mirror 57. They are sent back to mirror 53, and exit the device through the window 52 at the bottom of the enclosure. The image provided by this device is upright.

The device in FIG. 5A is identical to the one in FIG. 5 except that the flat mirrors 55 and 57 have been replaced by concave mirrors 58 and 59. These act as field "lenses" to provide a wider field of view. The photochromic layer must also conform to the concave shape of the mirror behind it and follows more closely the focal locus.

Ceiling Mounted Rearview Mirror

Figure 6A:
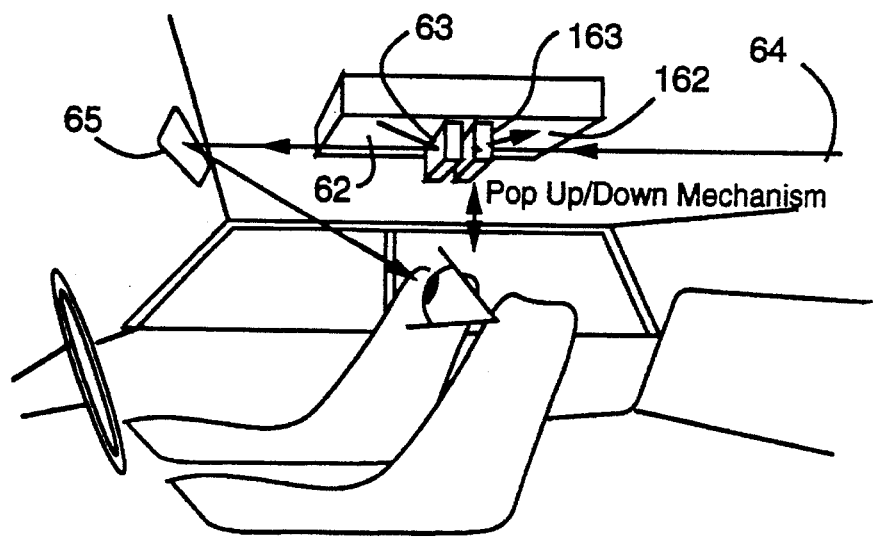
FIG. 6A describes a ceiling-mounted optical insert that converts an ordinary rearview mirror into an antiglare rearview device.
Figure 6B:
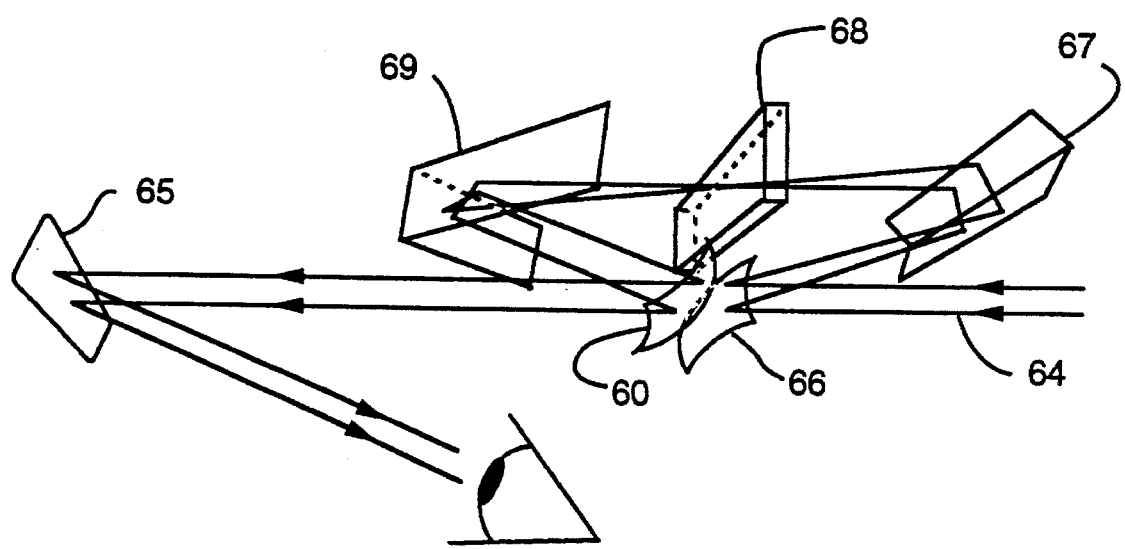
FIG. 6B provides a detailed functional view of the device shown in FIG. 6A.

FIG. 6 illustrates the construction of a ceiling mounted rearview mirror and its placement in a car. The optical components are enclosed in a box 61 equipped with a pop up/down mechanism to allow the device to be either inserted in the optical path of the light rays reaching the conventional rearview mirror, or stored out of the way when not in use. FIG. 6A describes in more detail the operation of the device. The device comprises mainly two concave mirrors 60 and 66 and two corner reflectors 67 and 69 which cancel out the image inversion produced by the concave mirrors. The device also contains a photochromic layer 68 located at the optical focal plane. The surfaces 62, 162, 63 and 163 are transparent and function as windows to allow rays to enter and leave the device. Light rays 64 originating from behind the driver, are reflected by the concave surface 66. The rays are then reflected and up/down inverted by the corner reflector 67. The rays reach a focus in the center of the device which holds the photochromic material 68 where the brightest rays are attenuated. The rays are then reflected and right/left inverted by the second corner reflector 69. They reflect from the second concave reflector 60. The rays continue on their path to a standard rearview mirror 65 where they are reflected toward the driver. Thus, this device intercepts, modulates and retransmits rays going through to a conventional rearview mirror.

Rearview/Forward View Device

Figure 7A:
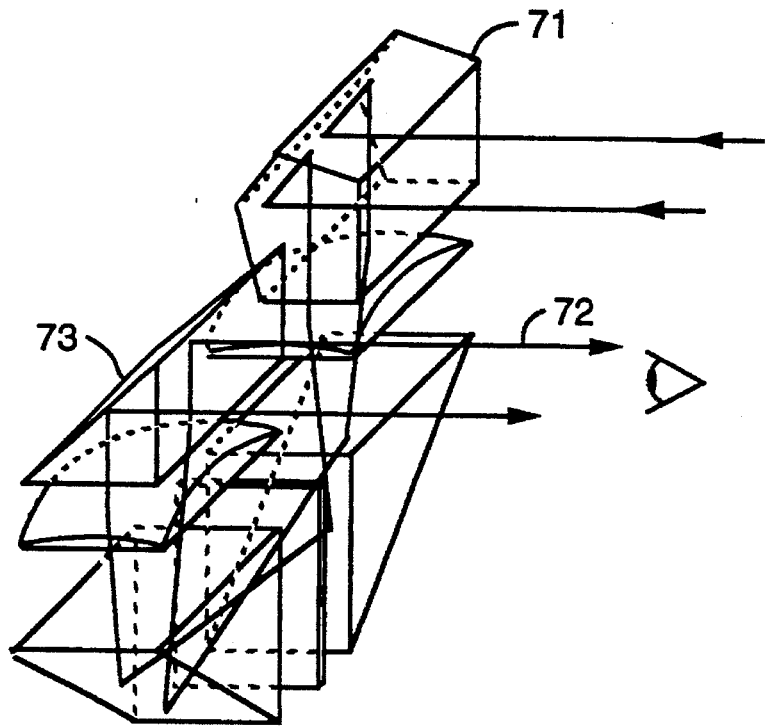
FIG. 7A illustrates a rearview device in which the major portion can be mounted vertically in the vehicle dashboard.
Figure 7B:
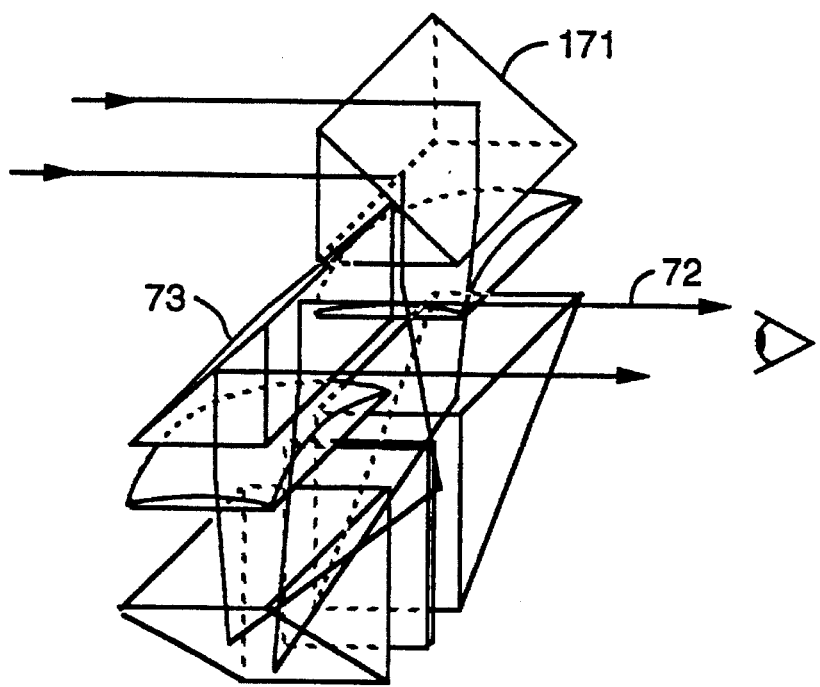
FIG. 7B shows how the device illustrated in FIG. 7A can be converted into an antiglare forward view device.

The device shown in FIG. 7 is almost identical to the basic device shown in FIG. 3, except that it is mounted vertically as in the vehicle dashboard. In addition, two prisms have been added, prism 71 which is a penta prism, and prism 73 which is a reflection prism. The incoming rays 72 enter the penta prism which deflects them down by 90 degrees without reversing the image. The rays then enter the basic device where the most intense rays are attenuated as already described in FIG. 3. The rays then leave the basic device and are deflected backward by prism 73. Prisms 71 and 73 could be mounted above and in front of the driver. The basic device could be mounted vertically in the vehicle dashboard.

FIG. 7A describes a small modification to the device in FIG. 7. The penta prism 71 is replaced by a reflection prism 171 which allows the device to convert from a rearview mirror to a forward view device. The conversion process could be implemented simply by rotating one prism out of the way and substituting the other in the optical path in order to achieve two modes of operation for this device.

Binoculars

Figure 8:
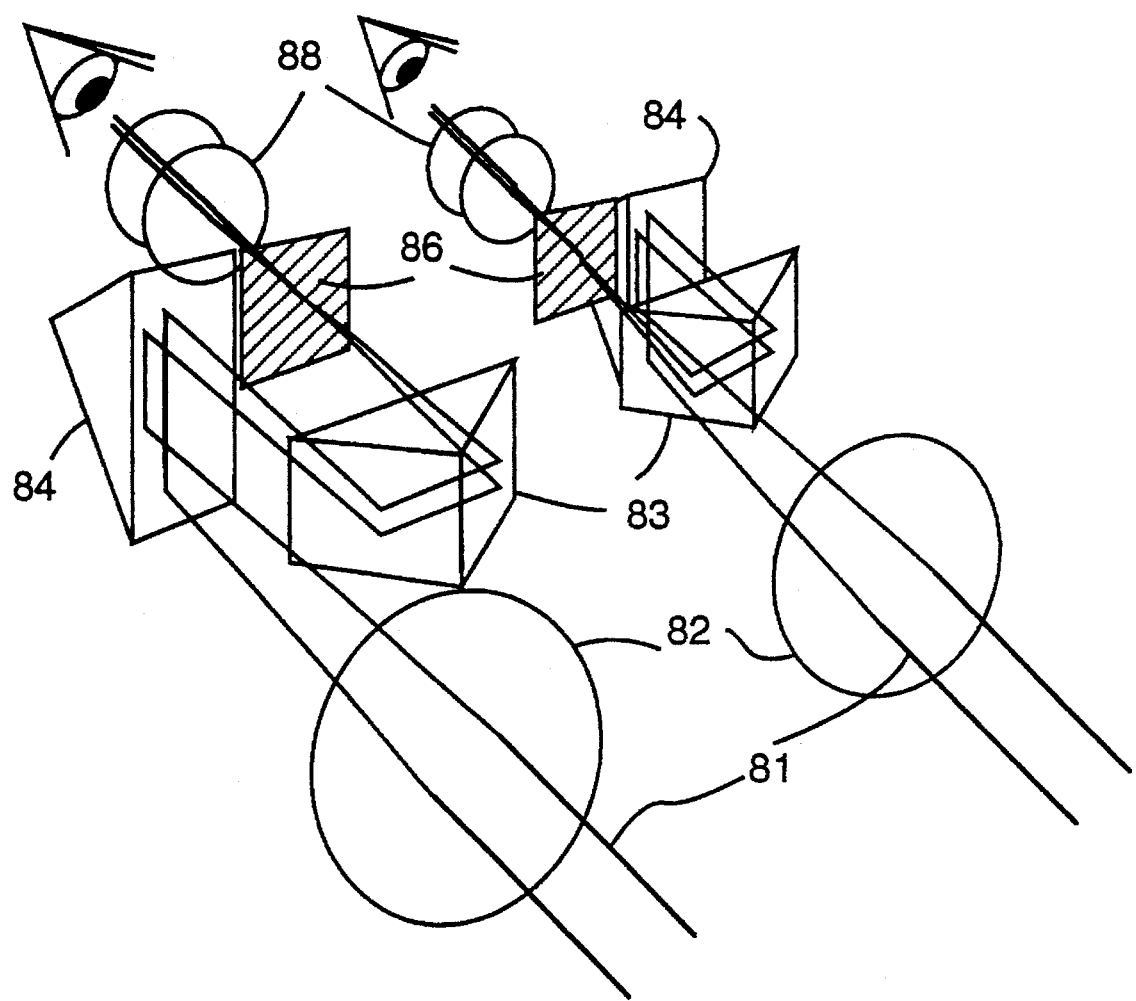
FIG. 8 provides a three dimensional view of prism binoculars equipped with an antiglare layer.

FIG. 8 describes how to incorporate antiglare technology in binoculars. Light rays 81 enter the binocular objective lens 82 and are inverted by prisms 83 and 84. The rays reach the photochromic layer 86 which is placed at the focal plane. There, bright rays are selectively attenuated. Finally the rays leave the device through the eyepiece lens 88. The image provided to the viewer is erect since the inversion produced by the lenses is cancelled by the inversion produced by the prisms.

Welding Goggles

Figure 9:
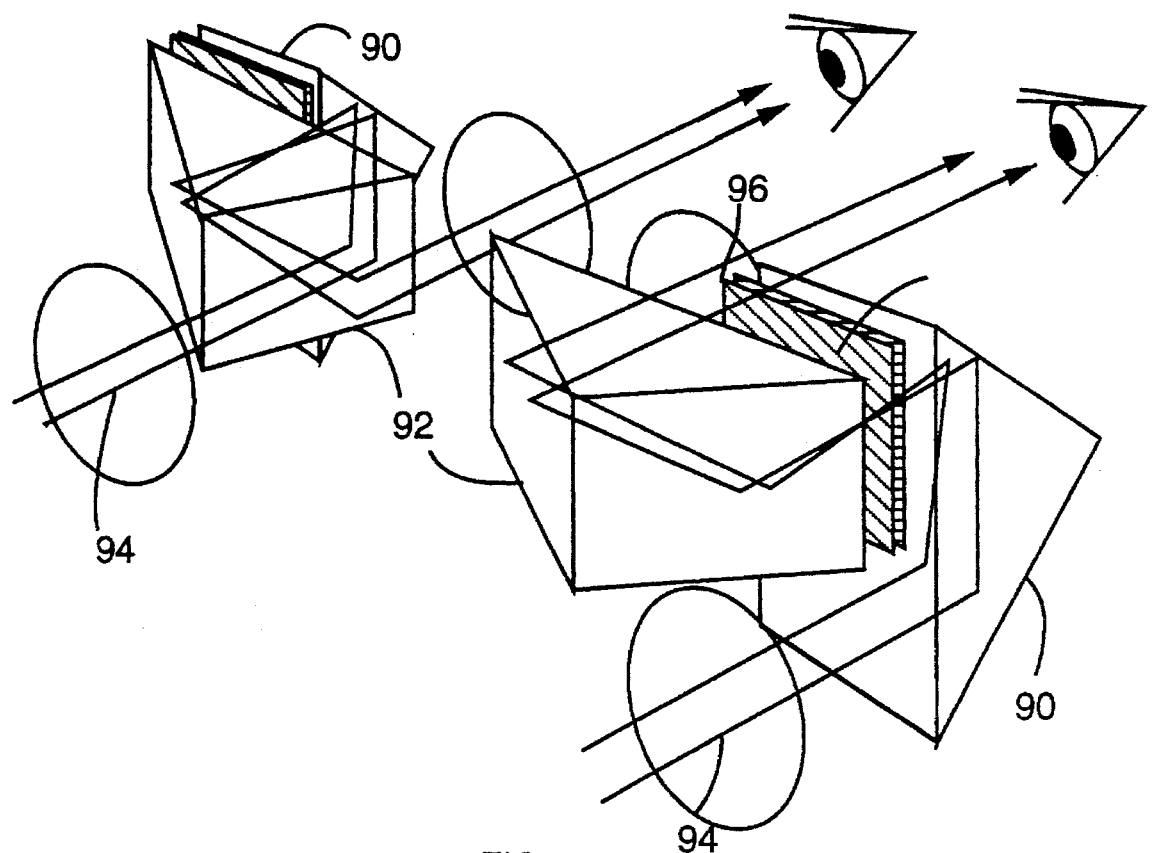
FIG. 9. describes a welding viewing device equipped with an antiglare layer.

FIG. 9 describes welding goggles equipped with the antiglare technology. The design resembles the one for binoculars, except that the photochromic layer 96 is placed between the prisms 90 and 92 since this is where the focal plane is, given the unity optical gain of the device. The rays 94 exit the optical system erect and available for viewing by the user. The prisms could be replaced by reflecting mirrors to achieve a lighter weight device.

Other Embodiments

While the above description contains many specificities, the reader should not construe these as limitations on the scope of the invention, but merely as exemplifications of preferred embodiments thereof. Those skilled in the art will envision many other possible variations within its scope. Accordingly the reader is requested to determine the scope of the invention by the appended claims and their legal equivalents, and not by the examples which have been given.

I claim:

1. An antiglare optical device for human viewing of an object field containing an intense light source said device comprising:
   a) an objective means for focusing an image of said object field onto a focal plane,
   b) an eyepiece means for viewing said image focused onto said focal plane,
   c) a moderating photoactive layer means located at said focal plane for moderating light from said intense light source,
   wherein said light passing through said optical device defines an optical path, and further comprising a folding means for folding said optical path.

2. A device as in claim 1 wherein said photoactive layer means comprises photochromic material.

3. A device as in claim 2 wherein said photochromic material comprises a heterogeneous photochromic assembly.

4. A device as in claim 2 wherein said photochromic material comprises a liquid crystal layer.

5. A device as in claim 2 wherein said photochromic material comprises a surface mode liquid crystal layer.

6. A device as in claim 2 wherein said photochromic material comprises absorbing dyes.

7. A device as in claim 2 wherein said photochromic material comprises electron transfer chemicals.

8. A device as in claim 1 wherein said photoactive layer comprises a liquid crystal display operating in a transparency mode, said display being controlled by a video signal generation means to provide images in said display.

9. A device as in claim 8 wherein the video image generated is aligned with, and is the negative of, the image focused by said objective means.

10. A device as in claim 1 comprising at least one field lens near said focal plane in order to increase the field of view of said device.

11. A device as in claim 1 wherein said objective means and said eyepiece means together comprise at least one compound lens.

12. A device as in claim 1 wherein said objective means and said eyepiece means together comprise at least one mirror.

13. A device as in claim 1 wherein said objective means and said eyepiece means together comprise at least one Fresnel optical component.

14. A device as in claim 1 wherein said folding means comprise at least one prism.

15. A device as in claim 1 wherein said folding means comprise at least one mirror.

16. A device as in claim 1 and further comprising a deflecting means for deflecting input rays, said deflecting means having two modes of operation such that optionally, either rays coming from the forward direction, or rays coming from the backward direction, are deflected toward the device.

17. A device as in claim 1 and further comprising a mounting means for mounting said device into the ceiling of a vehicle, wherein said device intercepts, modulates and retransmits rays going through to a conventional rearview mirror.

18. A device as in claim 1 wherein said device is fabricated in the shape of binoculars.

19. A device as in claim 1 wherein said device is fabricated in the shape of a welding visor.

20. A device as in claim 1 wherein said device is fabricated in the shape of space suit goggles.

21. A device as in claim 1 and further comprising an adjusting means for adjusting the operation of said photoactive layer by means of an electrical input.

22. A device as in claim 1 and further comprising baffles for stopping rays with high angular deviation from the optical axis.

23. A rearview mirror comprising:

a) a objective means for focusing light, from an object field rearward of a vehicle, onto a focal plane, b) an eyepiece means for viewing said image at said focal plane, c) a photochromic layer means located at said focal plane for moderating intense light from said object field, wherein said light passing through said rearview mirror defines an optical path, and further comprising a folding means for folding said optical path.

\* \* \* \* \*